Oct. 28, 1969    R. WATTS, JR    3,474,497

DIE FOR FORMING THERMOPLASTIC FILM

Filed March 3, 1967

INVENTOR.
RIDLEY WATTS JR.
BY Watts, Hoffmann,
Fisher & Heinke
ATTORNEYS

United States Patent Office

3,474,497
Patented Oct. 28, 1969

3,474,497
DIE FOR FORMING THERMOPLASTIC FILM
Ridley Watts, Jr., Cleveland, Ohio, assignor to The American Packaging Corporation
Filed Mar. 3, 1967, Ser. No. 620,343
Int. Cl. B29c 7/00; B29h 3/00
U.S. Cl. 18—19                                         10 Claims

ABSTRACT OF THE DISCLOSURE

A vacuum forming mold has work ejecting plungers in chambers in the die body surrounding a forming cavity. A mold cavity and plunger chambers communicate with a common pressure source. Positive pressure supplied to the mold cavity to eject a formed part extends the plungers, which mechanically assist in ejecting the formed work.

BACKGROUND OF THE INVENTION

Field of the invention

This invention relates to forming molds or dies for forming thermoplastic films, especially films forming window areas in card-type containers.

Description of the prior art

Display-type packages are well known in present day merchandizing. Many retail products are often packaged in separate units in order to show the products attractively against a display background which can contain artwork, illustrations of use, trademarks, and price. One type of display package having a flexible plastic pocket is described in detail in U.S. Patents 3,053,023 and 3,217,465 issued respectively Sept. 11, 1962 and Nov. 16, 1956 to Ridley Watts, Jr. That package as well as other types of display packages with which this invention is concerned fall into the general class in which a plastic enclosure such as a bubble or pocket is supported by a panel and encases a product.

In this general class of package, pockets or bubbles are initially formed in a plastic film to a shape that will receive a product to be packaged. One known technique is to vacuum form the plastic material after it has been heated to a forming temperature. This is accomplished by placing a thermoplastic material over the cavity of a forming mold and evacuating the cavity, thereby drawing the film into the cavity, and then cooling film to a stable temperature. A method and apparatus, including a forming mold for forming thermoplastic films of packages to a desired shape, is disclosed and claimed in the copending application Ser. No. 520,485 of Ridley Watts, Jr. and John F. Berry, filed Jan. 13, 1966 and entitled "Package Forming Machine and Method."

With automatic high speed forming machines which rapidly cycle a limited number of dies to successively form pockets in a series of cards, known mechanisms for removing formed containers from the molds have been too slow and unreliable. If formed containers are not rapidly and reliably removed from the molds, subsequent packages to be formed cannot be properly received, and production interruptions results. As disclosed in the aforementioned copending application of Ridley Watts and John F. Berry, it is known to invert a forming mold and to supply gas under positive pressure to the forming cavity to eject the formed container from the mold. However, with formed pockets that are flexible and supported on an apertured panel, sufficient flow of gas under pressure is required to turn the pocket inside out before the associated panel will be separated from the mold. This can result in a time lag that is undesirable in high production machines. In addition, where a package includes a rather large panel or card portion for the size of the pocket, the lifting force must be applied solely through the thin film of the pocket, which may be still somewhat softened from the forming operation. In some instances, especially where the pockets are located off-center, the card is not removed from the mold before another portion. As a result, the orientation of the cards at a receiving station is non-uniform, making subsequent handling more difficult. In other instances cards stick to the mold after forming. Air used to eject the card escapes from beneath a loose portion of the card and little or no force is continuously exerted to loosen the stuck portion.

SUMMARY OF THE INVENTION

The present invention is directed to improved apparatus for forming a pocket or bubble in a thermoplastic film, especially in a film forming a window in a card-type container, and for removing the formed film from a mold. An improved mold is provided, which includes a cavity for forming a thermoplastic film to a desired shape and movable plungers located about the cavity to remove or assist in removing the formed film. The plungers are contained in chambers of the mold that open through the surface of the mold beneath peripheral portions of the film and/or attached card or panel. Each plunger is movable from a position entirely within the chamber to a position where it partially extends through the openings in the surface in which the cavity is formed. In extended position, the plungers lift or assist in lifting the formed film from the mold surface.

A passageway is provided to the cavity of the mold for exhausting gas from and supplying gas to the cavity to vacuum form and assist in ejecting the plastic film portion of a container. The passageway also communicates with the plunger chambers so that the plungers in the chambers move in response to changes of the gas pressure in the cavity. When gas is withdrawn from the mold cavity to form the heated thermoplastic film, the plungers are biased into a position within the mold. When gas under pressure is introduced to the cavity beneath a formed plastic film in the cavity, the plungers are forced outward and extend from the surface of the mold around the cavity. As a result, the plungers push against peripherally extending portions of the film and/or surrounding card and mechanically and positively force the container from the mold at spaced locations about the cavity. Where a pocket is formed off center with respect to a surrounding card or panel, there nevertheless will be equal forces applied about the periphery of the container by the plungers. As a result, the package will be positively and uniformly removed from the forming mold. It will also be removed immediately, regardless of the size or flexibility of the pocket that is formed.

In the preferred embodiment, the plungers are spring biased to their withdrawn position to be certain that the plungers remain in withdrawn position even in the absence of reduced pressure in the cavity, unless positive pressure is supplied to the passageways of the mold.

Accordingly, the objects of this invention are to provide a novel and improved forming mold for forming and removing a formed thermoplastic film from the mold. Other objects and a more complete understanding of the invention will be obtained from the accompanying drawings briefly described below and the following detailed description.

DESCRIPTION OF THE PREFERRED EMBODIMENT

Figure 1:
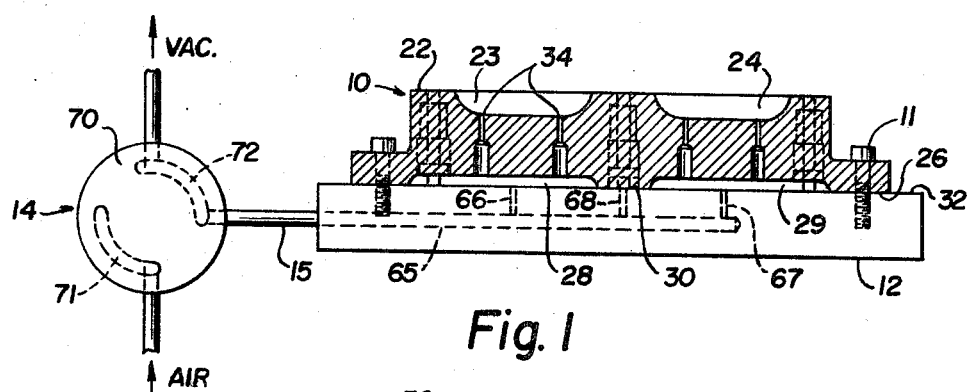
FIGURE 1 is a front elevational view, partially in section, showing a mold constructed in accordance with the present invention supported upon a platen, and diagrammatically indicating a control for alternately evacuating the mold and supplying gas under pressure.

Referring now to FIGURE 1, a mold 10 constructed in accordance with the present invention is shown secured by screws 11 to a platen 12 that supports the mold during operation and conducts gas to and from the mold. A pressure control valve 14 is shown connected by a conduit 15 to the platen 12. The pressure control valve 14 selectively connects the platen 12 to a source of vacuum or pressure during a forming cycle to first vacuum form a thermoplastic sheet supported on the mold 10, and to thereafter eject the formed sheet.

The construction of a preferred embodiment of the mold 10 is best understood from FIGURES 2 to 6 of the drawing. The mold 10 is in the form of a body 20, typically of metal, such as aluminum, and is generally rectangular in plan. An upper mold surface 22 (in the orientation shown in the drawing) is essentially flat, except for two spaced cavities 23, 24. The cavities 23, 24 are located to underlie thermoplastic window areas of a card or panel-type container. The cavities are in the desired shape to which the thermoplastic film is to be formed. For example, in the mold shown, the cavities 23, 24 are in a shape to form pockets that will accommodate a steel measuring tape that is disc-shaped and which will be packaged in the formed container.

The opposite or bottom surface 26 of the mold body 20 is also flat except for two shallow plenum cavities 28, 29 and a transverse central and a channel 30, in which varying pressures can be established by flows of gas through the platen 12. In the embodiment shown, the opposite surface 26 is generally parallel to the upper mold surface 22 and is constructed to fit flush against a supporting surface 32 (see FIGURE 1) of the platen 12. The shallow plenum cavity 28 underlies the forming cavity 23 and a surrounding area of the mold surface 22. Similarly, the shallow plenum cavity 29 underlies the forming cavity 24 and a surrounding area of the mold surface 22. The channel 30 is located between the plenum cavities 28, 29 and extends across the width of the bottom surface 26, so as to be open at opposite ends 30a, 30b.

Four passageways 34 communicate between the forming cavity 23 and the plenum cavity 28. Similarly, four passageways 36 communicate between the forming cavity 24 and the plenum cavity 29. These passageways 34, 36 conduct gas between the forming cavities 23, 24 and the plenum cavities 28, 29.

Six chambers 40a–f, are located in the mold body 20 about the forming cavities 23, 24. The chambers 40 extend through the mold body 20, and open through the top surface 22. Two of the chambers 40a, 40b are located to the outside of the forming cavity 23, adjacent one end of the mold and communicate with the plenum cavity 28. Two other chambers 40c, 40d are located to the outside of the forming cavity 24, adjacent the other end of the mold and communicate with the plenum cavity 29. The two chambers 40e, f are aligned between the two forming cavities 23, 24, and communicate with the channel 30.

Each of the chambers 40a–f are identical in construction. As best shown by chamber 40f in FIGURE 6, each is cylindrical and has three axial portions of different diameter. The largest diameter portion 41 of each chamber 40 is adjacent the base of the mold and communicates directly with a plenum cavity 28, 29 or the channel 30. The smallest diameter portion 42 opens through the mold surface 22. A portion of intermediate diameter 43 lies axially between the two and defines a shoulder 44 with the largest diameter portion 41 and a shoulder 45 with the smallest diameter portion 42.

A plunger 50 is located within each chamber 40 and is axially movable. Each plunger 50 extends through the height of the respective chamber 40 and extends from the bottom to a level with the base surface 26. Each is circular in cross section, and consists of an ejecting stem 52 that slides within the smallest diameter portion 42 of the associated chamber 40. A spring-aligning portion 54 of the plunger 50 is located behind the ejection stem 52, is somewhat larger in diameter and tightly receives a surrounding portion of a coil spring 56. The diameter of the spring locating portion 54 is small enough that both it and the surrounding coil spring 56 can be received in the intermediate diameter portion 43 of the associated chamber 40. A large diameter obturating portion or piston 58 is at the opposite end of the spring locating portion 54 from the ejecting stem, and is tightly telescoped in sliding relationship within the largest diameter portion 41 of the associated chamber 40. One end of the spring 56 rests against the piston 58. The opposite end of the spring 56 is retained and centered within the chamber 40 by a shake washer 59 which the spring biases against the shoulder 45 at the upper end of the intermediate diameter portion 43. A base portion or foot 60 forms the inner end of the plunger 50, and is adapted to rest against the supporting surface 32 of the platen 12 when the plunger 50 is in a withdrawn position, where it does not extend from the surface 22.

The supporting platen 12, as shown, is generally rectangular and flat and is intended to be supported for movement, as on a rotating drum so that a plurality of platens and supported molds can be cycled to receive containers to be formed, form the containers, eject the formed containers and then receive a new container for forming. One such mechanism is disclosed and claimed in the aforementioned copending application of Ridley Watts, Jr. and John F. Berry. Insofar as the present invention is concerned, the platen 12 can be supported in any manner desired.

A manifold 65 is formed within the supporting platen 12, and is connected by one or more passageways 66 to the plenum cavity 28, by one or more passageways 67 to the plenum cavity 29, and by one or more passageways 68 to the channel 30. The conduit 15 is connected to the manifold 65 and selectively communicates through the pressure control valve 14 to a source of vacuum or air. The pressure control valve 14 can take any of a number of forms, including a manual valve, a solenoid valve operated by a control circuit, or where the platen is carried on a drum, the pressure control valve 14 can comprise a rotatable disc 70, as shown, having two partial grooves 71, 72. The disc 70 rotates with a drum that supports the platen 12. As the disc rotates, the grooves 71, 72 alternately connect the conduit 15 with a source of vacuum and a source of air or other gas under pressure, therbey cycling the pressure to the mold 10 to first form a container on the mold 10 and to then eject the formed container during one revolution.

Figure 2:
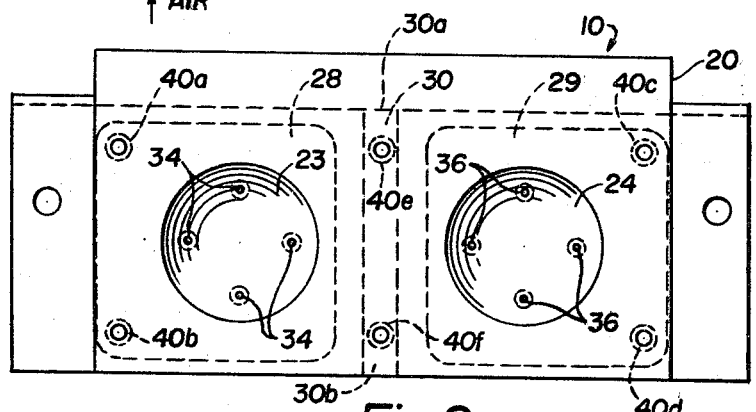
FIGURE 2 is a top plan view of the mold and platen of FIGURE 1.
Figure 3:
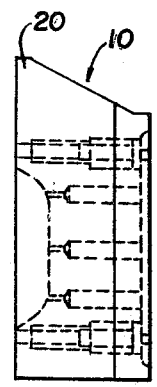
FIGURE 3 is a side elevational view of the mold of FIGURE 2, showing the internal construction in phantom.
Figure 4:
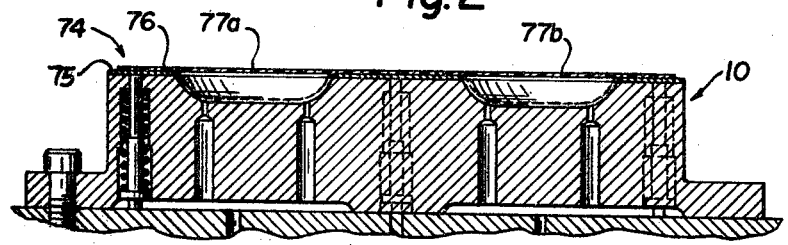
FIGURE 4 is a partial longitudinal sectional view similar to FIGURE 1, on an enlarged scale, showing details of construction and illustrating a container with pockets formed in mold cavities.
Figure 6:
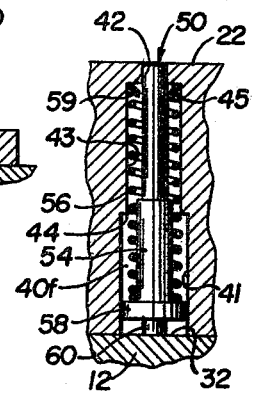
FIGURE 6 is a partial sectional view of a mold constructed in accordance with the present invention, showing the details of construction of the plunger.

In operation, a card-type container, indicated generally at 74 in FIGURE 2 of the drawing is placed on the mold surface 22. The container 74 includes a flat panel 75 having two large apertures that overlie the forming cavities 23, 24. A thermoplastic film 76 is adhered to the panel 75 and extends over the two apertures, forming two windows 77a, 77b which are to be formed into pockets within the forming cavities 23, 24. The thermoplastic film 76 may be heated either prior to being placed upon the mold surface 22, or after.

With the thermoplastic film 76 at a forming temperature (a temperature at which the film is soft and can be formed), the pressure control valve 14 is moved to connect the conduit 15 with a source of vacuum. The source of vacuum reduces the pressure in the manifold 65, passageways 66 and thus in the shallow plenum cavities 28, 29, and channel 30. This withdraws gas through the passageways 34, 36 from within the forming cavities 23, 24, creating a differential pressure on opposite sides of the softened thermoplastic film forming the window areas 77a, 77b. As a result, the window areas of the thermoplastic film are stretched and brought into contact with the forming cavities 23, 24. The reduced pressure has no effect on the plungers 50 other than to further bias them along with the springs 56 to a withdrawn position.

After the formed film has cooled to a temperature at which it is essentially dimensionally stable, the formed container must be removed from the mold 10. At this time, the pressure control valve 14 connects the conduit 15 with a source of air or other gas under pressure. The gas under pressure is communicated by the manifold 65 and the passageways 66, 67, 68 to the plenum cavities 28, 39, and the channel 30. As a result, the gas simultaneously exerts a positive pressure on the formed pockets, through the passageways 34, 36 and on the pistons 58 of the plungers 50 in the chambers 40. Flow of gas to the cavities 23, 24 through passageways 34, 36 forces the formed thermoplastic film out of the cavities 23, 24. At the same time, pressure is applied to the lower surface of the piston portions 58 of the six plungers 50 with a force sufficient to overcome the biasing force of the springs 56 and the resistance of the container 74 covering the chambers 40. The plungers 50 exert positive mechanical pressure against the panel 75 of the container 74 at six peripherally spaced locations about the container and movement of the plungers separates the panel 75 from the mold surface 22. Due to the construction of the passageways 66–68, plenums 28, 29, and channel 30 in the mold body 20, the pressure applied to each plunger 50 is substantially equal and each plunger is simultaneously and rapidly extended from the mold. Equal pressure is assured by providing equal inlets to plenum cavities 28, 29 and channel 30 from a common source. The open ends 30a, 30b of channel 30 compensate for the larger volume of plenum cavities 28, 29 and for the flow through passageways 34, 36.

Figure 5:
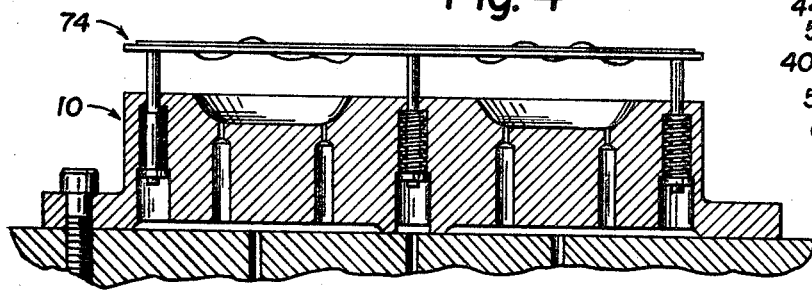
FIGURE 5 is a partial longitudinal sectional view similar to FIGURE 4, diagrammatically illustrating the manner in which a container is removed from the mold.

The manner in which the plungers move to force the container 74 from the mold surface 22 is diagrammatically illustrated in FIGURE 5. At the time of ejection it is preferable to orient the supporting platen 12 and mold 10 in an inverted or vertical position to facilitate subsequent movement of the container 74 by gravity from adjacent the surface of the mold 10 to a receiver.

After the container 74 has been ejected from the mold surface 22, the pressure control valve 14 disconnects the flow of gas under pressure to the conduit 15. At that time, the springs 56 assure that the plungers 50 will be withdrawn into the chambers 40 even though the vacuum source has not yet been connected again. A flush mold surface 22 is thereby presented to receive the next container 74. Once the pressure control valve 14 again communicates the conduit 15 to the source of vacuum, the reduced pressure assists in retaining the plungers 50 within the cavities 40.

Depending upon the construction of the forming machine with which the mold 10 and supporting platen 12 are used, it is possible in some instances to omit the springs 56. Thus, where the mold 10 is in an upright position as shown in FIGURE 1 at the time a container 74 is placed on the mold surface 22, the plungers 50 would be gravity biased to a withdrawn position. If the supporting platen 12 and mold 10 are then connected with the vacuum at the time the mold and platen are revolved during a forming cycle, the vacuum applied to the plenum cavities 28, 29 and channel 30 will retain the plungers 50 in withdrawn position during a vacuum forming operation even though the mold is inverted.

In accordance with the invention described above, a container formed at least in part of a thermoplastic material can be vacuum formed and thereafter positively and uniformly ejected from the forming mold in a simple and effective manner by a mechanism entirely contained within the forming mold. The mold requires no modification or alteration of existing supporting platen assemblies that are conventionally used with vacuum molds.

While a preferred embodiment of this invention has been described with particularity, it will be appreciated that various modifications or alterations may be made therein without departing from the spirit or scope of the invention, as set forth in the appended claims.

What is claimed is:

1. Apparatus for forming a thermoplastic sheet, comprising:
    (a) a forming mold having a surface for supporting a thermoplastic film,
    (b) a forming cavity in the mold located to underlie a portion of a film supported by the said mold surface,
    (c) a passageway through the mold opening into the cavity,
    (d) a chamber in the mold spaced from the cavity and opening through the said mold surface,
    (e) a plunger in the chamber having an ejecting portion movable through the chamber opening between a position within the chamber and a position extending from the chamber, and
    (f) means to connect the passageway and the chamber to a common source of fluid pressure that can be varied from ambient pressures.

2. The apparatus of claim 1 wherein the plunger includes an obturating portion in the chamber movable toward and away from the said surface in response to changes in pressure on opposite sides, and wherein the chamber includes a second opening located so that the obturating portion is between the first and second openings, said second opening being in communication with the means to connect the passageway and chamber to a common source of pressure.

3. The apparatus of claim 2 including means to vary the pressure in the means connecting the passageway and the chamber to a common source of pressure from pressures lower than ambient to pressures higher than ambient.

4. The apparatus of claim 2 including a spring within the chamber surrounding at least a portion of the plunger and constructed and arranged to bias the plunger relative to the chamber to a position where the ejection portion is within the chamber.

5. Apparatus for forming a pocket in a card-type container having a window area in a panel covered with a thermoplastic film, the apparatus comprising:
    (a) a mold;
    (b) an outer surface to the mold, said outer surface including
        (i) a cavity to receive and shape a thermoplastic film of a container and
        (ii) a surface surrounding the cavity to receive a panel portion of the container surrounding the window area;
    (c) passageways in the mold opening into the cavity;
    (d) chambers in the mold each having a first opening through the surface surrounding the cavity;
    (e) a second opening in each chamber remote from the first opening;
    (f) ejectors in the chambers, in part movable through respective first openings of the chambers between positions where the ejectors extend from the mold through the said surrounding surface and positions where they do not so extend, said ejectors being constructed and arranged to be movable between the said positions in response to a difference in fluid pressure between the two openings of the chambers; and (g) means to
(i) withdraw gas from the cavity to form a pocket in a heat-softened overlying window area of a card-type container and
(ii) thereafter introduce gas through the said passageways to the cavity between the formed pocket and the cavity and simultaneously to the chambers to extend the ejectors from the mold through the said surface surrounding the cavity, whereby the formed pocket is lifted from the cavity and the panel from the surrounding surface and the container is ejected from the mold.

6. The apparatus of claim 5 wherein the ejectors are plungers that each include an obturating portion located within the respective chamber between the first and second openings for moving the plunegrs in response to differences in pressure between the two openings.

7. The apparatus of claim 6 including a spring within each chamber surrounding at least a portion of the plunger in the chamber and constructed and arranged to bias the plunger relative to the chamber to a position where the plunger does not extend from the mold through the said surrounding surface.

8. The apparatus of claim 5 wherein the means to introduce gas to the cavity and the chambers includes a plenum cavity common to both the cavity and to a chamber.

9. A mold for forming a thermoplastic sheet, especially a thermoplastic sheet adhered across an aperture in a card-type container, to form an article retaining pocket, said mold comprising:
(a) a generally flat surface for supporting a first portion of a thermoplastic film,
(b) a forming cavity in the said surface located to underlie a portion of the thermoplastic film to be formed,
(c) a plurality of passageways in the mold opening through the said surface about the cavity,
(d) a plunger in each of said passageways movable between a position in which the plunger extends from the mold beyond the said surface and a position in which the plunger is at or beneath the said surface,
(e) additional passageways in the mold, opening into the cavity, and
(f) means to concurrently supply gas under pressure to said plurality of passageways and said additional passageways to lift a molded thermoplastic film from the surface of the mold.

10. The mold of claim 9 wherein the plungers include an obturating portion in the passageway behind the surface of the mold, and means to supply fluid under pressure to the passageway behind the obturating portion to move the plunger to a position in which it extends from the mold beyond the said surface.

References Cited
UNITED STATES PATENTS

| | | |
|---|---|---|
| 2,493,439 | 1/1950 | Braund. |
| 2,629,135 | 2/1953 | Johnson. |
| 2,865,052 | 12/1958 | Wilcox. |
| 3,180,776 | 4/1965 | Hessel. |
| 3,327,355 | 6/1967 | Carlin. |

WILLIAM J. STEPHENSON, Primary Examiner

U.S. Cl. X.R.
18—2, 35